United States Patent
Gomes et al.

(10) Patent No.: US 11,487,556 B2
(45) Date of Patent: Nov. 1, 2022

(54) COMMAND-TYPE FILTERING BASED ON PER-COMMAND FILTERING INDICATOR

(71) Applicant: INTERNATIONAL BUSINESS MACHINES CORPORATION, Armonk, NY (US)

(72) Inventors: Louis P. Gomes, Poughkeepsie, NY (US); Richard Victor Kisley, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 108 days.

(21) Appl. No.: 17/122,346

(22) Filed: Dec. 15, 2020

(65) Prior Publication Data

US 2022/0188125 A1 Jun. 16, 2022

(51) Int. Cl.
  *G06F 9/445* (2018.01)
  *G06F 9/48* (2006.01)
  *G06F 21/72* (2013.01)

(52) U.S. Cl.
  CPC ........ *G06F 9/44505* (2013.01); *G06F 9/4843* (2013.01); *G06F 21/72* (2013.01)

(58) Field of Classification Search
  CPC .................................................. G06F 9/44505
  See application file for complete search history.

(56) References Cited

U.S. PATENT DOCUMENTS

| | | | |
|---|---|---|---|
| 8,261,054 B2 | 9/2012 | Smith | |
| 8,584,229 B2 | 11/2013 | Brutch et al. | |
| 10,476,841 B2 | 11/2019 | Gaddehosur et al. | |
| 2002/0131368 A1 | 9/2002 | Raftelis | |
| 2010/0100656 A1 | 4/2010 | Gainey | |

(Continued)

FOREIGN PATENT DOCUMENTS

| CN | 106687923 A | 5/2017 |
|---|---|---|
| CN | 111045594 A | 4/2020 |

(Continued)

OTHER PUBLICATIONS

IBM, "z/Architecture—Principles of Operation," IBM Publication No. SA22-7832-11, Twelfth Edition, Sep. 2017, pp. 1-1902.
Mell, Peter and Tim Grance, "The NIST Definition of Cloud Computing," National Institute of Standards and Technology, Information Technology Laboratory, Special Publication 800-145, Sep. 1, 2011, pp. 1-7.

(Continued)

*Primary Examiner* — Charlie Sun
(74) *Attorney, Agent, or Firm* — Edward J. Wixted, III; Blanche E. Schiller, Esq.; Heslin Rothenberg Farley & Mesiti P.C.

(57) ABSTRACT

An adjunct processor dynamically determines, on a per-command basis, whether commands obtained by the adjunct processor are to be processed by the adjunct processor. The adjunct processor obtains a command request of a requester. The command request includes at least one filtering indicator indicating at least one valid command type for processing by the adjunct processor for the requester. The adjunct processor determines using the at least one filtering indicator whether a command of the command request is valid for processing by the adjunct processor for the requester. Based on determining that the command is valid for processing by the adjunct processor, the command is processed by the adjunct processor.

25 Claims, 12 Drawing Sheets

(56) References Cited

U.S. PATENT DOCUMENTS

| | | | | |
|---|---|---|---|---|
| 2011/0083161 A1* | 4/2011 | Ishida | ............... | G06F 21/572 |
| | | | | 726/2 |
| 2012/0167097 A1* | 6/2012 | Condorelli | ............ | G06F 9/4843 |
| | | | | 718/101 |
| 2012/0311095 A1* | 12/2012 | Rahardja | ............... | H04L 67/75 |
| | | | | 709/219 |
| 2014/0181453 A1 | 6/2014 | Jayasena | | |

FOREIGN PATENT DOCUMENTS

| | | |
|---|---|---|
| WO | WO9961982 A1 | 2/1999 |
| WO | WO03042819 A1 | 5/2003 |

OTHER PUBLICATIONS

Ishiguro, Kenta et al., "Instruction Filters for Mitigating Attacks on Instruction Emulation in Hypervisors," IEICE Trans. Inf. & Syst., vol. E103-D, No. 7, Jul. 2020, pp. 1660-1671.

Gomes. Louis P. "Adjunct Processor Command-Type Filtering," U.S. Appl. No. 17/122,363, filed Dec. 15, 2020, pp. 1-68.

List of IBM Patents or Patent Applications Treated as Related, Mar. 8. 2021, 2 pages.

Notification of Transmittal of the International Search Report and the Written Opinion of the International Searching Authority, PCTCN2021132683, dated Feb. 22, 2022, (9 pages).

Notification of Transmittal of the International Search Report and the Written Opinion of the International Searching Authority, PCTEP2021082175, datedFeb. 22, 2022, (11 pages).

* cited by examiner

DYNAMICALLY DETERMINING, BY AN ADJUNCT PROCESSOR, WHETHER COMMANDS OBTAINED BY THE ADJUNCT PROCESSOR ARE TO BE PROCESSED BY THE ADJUNCT PROCESSOR ~500

502 —

THE DYNAMICALLY DETERMINING IS PERFORMED ON A PER-COMMAND BASIS AND INCLUDES:

OBTAINING, BY THE ADJUNCT PROCESSOR, A COMMAND REQUEST OF A REQUESTER ~504

THE COMMAND REQUEST INCLUDES AT LEAST ONE FILTERING INDICATOR INDICATING AT LEAST ONE VALID COMMAND TYPE FOR PROCESSING BY THE ADJUNCT PROCESSOR FOR THE REQUESTER ~506

DETERMINING, BY THE ADJUNCT PROCESSOR USING THE AT LEAST ONE FILTERING INDICATOR, WHETHER A COMMAND OF THE COMMAND REQUEST IS VALID FOR PROCESSING BY THE ADJUNCT PROCESSOR FOR THE REQUESTER

PROCESSING THE COMMAND, BY THE ADJUNCT PROCESSOR, BASED ON DETERMINING THAT THE COMMAND IS VALID FOR PROCESSING BY THE ADJUNCT PROCESSOR FOR THE REQUESTER ~510

508

THE ADJUNCT PROCESSOR IS CONFIGURED IN ONE MODE AND THE DYNAMICALLY DETERMINING ENABLES IT TO OPERATE DIFFERENTLY THAN THE ONE MODE IN WHICH IT IS CONFIGURED ~512

THE ADJUNCT PROCESSOR CONFIGURED IN ONE MODE IS ABLE TO PROCESS A SET OF COMMANDS ~514

THE ADJUNCT PROCESSOR OPERATES DIFFERENTLY IN THAT IT PROCESSES A REDUCED SET OF THE SET OF COMMANDS ~516

FIG. 5A

COMMAND-TYPE FILTERING BASED ON PER-COMMAND FILTERING INDICATOR

BACKGROUND

One or more aspects relate, in general, to facilitating processing within a computing environment, and in particular, to facilitating processing associated with command processing within the computing environment.

Computing environments often include different types of processors to enhance processing. As an example, a computing environment may include one or more central processing units, which are considered the main processors, and one or more adjunct processors that are considered subordinate to the central processing units. An adjunct processor typically performs specific types of tasks. For instance, a particular example of an adjunct processor is a cryptographic (crypto) card which is used to perform cryptographic operations.

An example of a cryptographic card offered by International Business Machines Corporation, Armonk, N.Y., is a channel attached Crypto Express card. A Crypto Express card is defined to support multiple types of commands, such as commands using encrypted keys (referred to as secure-key commands), commands using clear keys (referred to as clear-key commands), hash commands, query commands, random number generator commands, etc. Further, a Crypto Express card is designed to support multiple modes, including, for instance: a Common Cryptographic Architecture (CCA) mode, an accelerator mode, and an Enterprise Public Key Cryptographic Standards (PKCS) mode (a.k.a., XCP/EP11—Enterprise PKSC #11 mode). Each mode is configured to process specific types of commands.

A Crypto Express card can be configured to operate in one of the different multiple modes for the duration of the activated machine configuration. Therefore, if a customer wishes to use the different modes, the computing environment would include at least the number of cards for the different multiple modes, each one configured in a different mode and able to process specific types of commands as defined for that mode.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes dynamically determining, by an adjunct processor, whether commands obtained by the adjunct processor are to be processed by the adjunct processor. The dynamically determining is performed on a per-command basis and includes obtaining, by the adjunct processor, a command request of a requester. The command request includes at least one filtering indicator indicating at least one valid command type for processing by the adjunct processor for the requester. The adjunct processor determines, using the at least one filtering indicator, whether a command of the command request is valid for processing by the adjunct processor for the requester. The adjunct processor processes the command, based on determining that the command is valid for processing by the adjunct processor for the requester.

By dynamically determining on a per-command basis whether an adjunct processor is to process a particular command, flexibility is provided in command processing. A command is either valid or invalid at command processing time, and thus, the program does not have to switch between various adjunct processors to execute different types of commands. This reduces program complexity, providing more efficient code and improving code execution time and performance.

In one embodiment, the adjunct processor is configured in one mode and the dynamically determining enables it to operate differently than the one mode in which it is configured. For instance, in one example, the adjunct processor configured in the one mode is able to process a set of commands; however, the adjunct processor operates differently in that it processes a reduced set of the set of commands. The adjunct processor is able to switch filtering modes dynamically for each command, since command-type filtering is provided on a per-command basis. This allows a particular adjunct processor to be used in different modes. For instance, the adjunct processor may be configured in one mode but is able to operate in a different mode without reconfiguring the adjunct processor. Further, by enabling an adjunct processor to operate in different modes, the expense of additional adjunct processors is saved, and flexibility is provided within the system.

In one embodiment, the at least one filtering indicator is set on a per-command basis. By providing a per-command filtering indicator, flexibility in command processing is provided, as well as reduced code complexity, increased performance, and reduced expenses since fewer adjunct processors may be needed.

In one embodiment, the at least one filtering indicator is set based on a computing policy corresponding to the requester of the command request. This allows the particular licensing attributes, permissions and/or customer requirements to be considered in command processing.

In one embodiment, the at least one filtering indicator includes a stateless command type indicator, in which based on the stateless command type indicator being set to one value, commands determined to be stateless command type commands are valid for processing by the adjunct processor for the requester and other command type commands are invalid for processing by the adjunct processor for the requester. Further, in one embodiment, based on the stateless command type indicator being set to another value, the other command type commands are also considered valid for processing by the adjunct processor for the requester. This allows an adjunct processor configured in a mode that provides a full set of commands to be used to provide selective commands instead of the full set of commands for one or more requesters, and the full set of commands for other requesters. This provides flexibility, reduced code complexity, increased performance, and reduced expenses since fewer adjunct processors may be needed.

In one embodiment, the processing includes preparing a reply that includes a result of the processing of the command, the reply to be sent to the requester. Further, in one embodiment, an error reply is prepared that indicates an error based on determining that the command is invalid for processing by the adjunct processor for the requester, the error reply to be sent to the requester. The error reply informs the requester that the command is an invalid command type.

As one example, the adjunct processor is a cryptographic card.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 5A-5B depict one embodiment of aspects related to facilitating processing within a computing environment, in accordance with one or more aspects of the present invention;

DETAILED DESCRIPTION

Figure 1A:
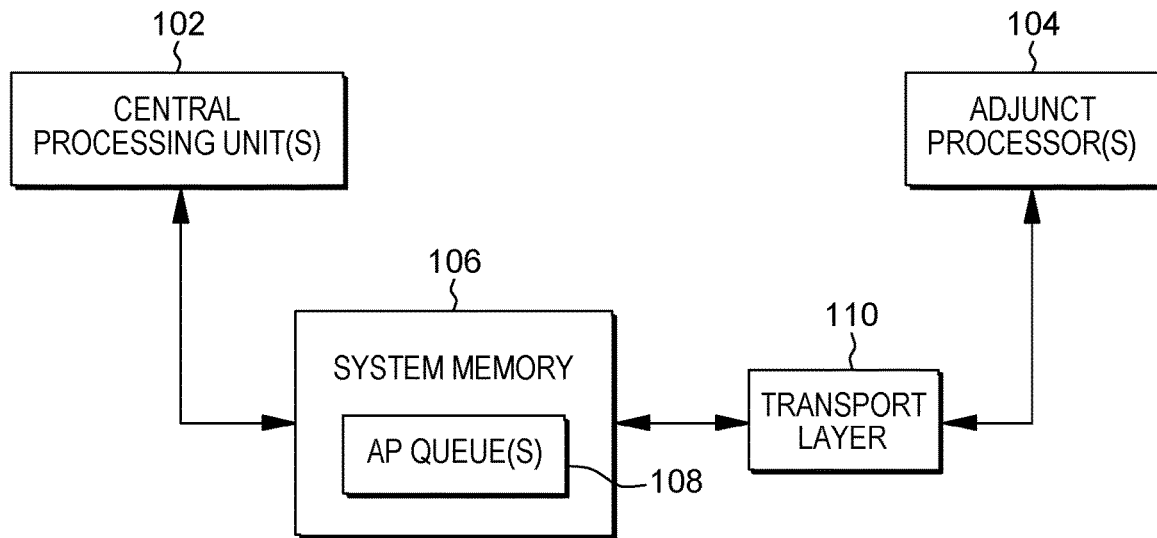
FIG. 1A depicts one example of a computing environment to incorporate and use one or more aspects of the present invention.

In accordance with one or more aspects of the present invention, a filtering capability is provided that enables an adjunct processor, such as a cryptographic (crypto) card, to dynamically determine, on a per-command basis, whether a command obtained by the adjunct processor is to be executed by the adjunct processor. For instance, one or more per-command filtering indicators (e.g., selected command-type filtering indicators) are used to determine whether a received command is a valid command type as specified by the per-command filtering indicators and thus, is to be executed by the adjunct processor. In one embodiment, the one or more per-command filtering indicators are set per command based on a computing policy associated with the requester of the command. Thus, a command issued by one requester may be a valid command type for execution, but issued by another requester may be invalid, as specified by the per-command filtering indicators set based on computing policies of the requesters.

In one or more aspects, the adjunct processor is configured in a particular processing mode (e.g., the Common Cryptographic Architecture (CCA) mode; a.k.a., co-processor mode) but is able to have filtering applied such that it operates differently than the configured mode without being reconfigured. For instance, based on filtering, such as selected command-type filtering, commands of one or more selected command types (e.g., stateless command-type commands) are executed by the adjunct processor, in which the selected command types are fewer than all the command types supported by the configured mode. That is, a command that may be supported in the configured processing mode (e.g., a non-stateless command-type command) may not be executed by the adjunct processor, in a particular instance, when selected command-type filtering is applied if it is not of a selected command type (e.g., a stateless command-type command).

In one example, the filtering technique that is applied is a stateless command-type filtering technique in which the adjunct processor configured in one mode (e.g., a co-processor mode) can be used to either execute a full set of command types supported in this mode or a reduced set of command types (e.g., only stateless command-type commands). However, although the stateless command-type filtering technique is described herein as one example, other command-type filtering techniques and/or other filtering techniques may be applied. For example, a master key filtering technique may be used in which the selected command types are master key management key commands. As another example, filtering may be implemented with policy imposed use case limits. For instance, if a selected command access is priced differently from general cryptography command accesses, a filter may be imposed for the purchased use case. A further level of filtering may be based on a performance service agreement, where commands are noted with high or low service response performance priorities based on the purchased performance. Other filtering techniques may also be used. The application of each of the filtering techniques is permissible without reconfiguring the adjunct processor for another mode. The filtering techniques may be used in conjunction with or separate from one another. Many examples are possible.

One embodiment of a computing environment to incorporate and use one or more aspects of the present invention is described with reference to FIG. 1A. In one example, a computing environment 100 includes at least one central processing unit 102 and at least one adjunct processor (AP) 104, each of which is coupled to at least a portion of memory, referred to as system memory 106. As one example, system memory 106 includes a hardware system area, which is indirectly accessible and not visible to programs executing on the central processing unit(s). (Indirectly accessible is used herein to mean that the hardware system area or adjunct processor queue(s) stored therein (described below) are only accessible by specific limited instructions and not otherwise accessible (e.g., cannot load into it, programs are unaware of addresses, etc.)). Located within the system memory are one or more adjunct processor queues 108. These queues are not directly visible from user programs and are instead considered a part of the machine (i.e., the machine that includes the central processing unit(s), system memory and adjunct processor(s)). A central processing unit has access to the queues in system memory by, for instance, issuing instructions to place requests on the queue, and/or to remove replies from the queue. The adjunct processor, however, does have direct access to the queues via, e.g., a transport layer 110 (e.g., i390CO), and is responsible for taking requests off the queue, processing the requests, and placing replies to the requests on the queue.

Another embodiment of a computing environment to incorporate and use one or more aspects of the present invention is described with reference to FIG. 1B. In this embodiment, the machine includes virtual support, and there is at least one host central processing unit 150 that includes a plurality of guests 152 (e.g., guest operating systems and/or guest programs). The host central processing unit is coupled to at least a portion of memory, referred to as system memory 154. Additionally, there is at least one adjunct processor 156, which is also coupled to system memory 154, via, for instance, a transport layer 160. As one example, system memory 154 includes a hardware system area, and located within the system memory are one or more adjunct processor queues 158.

As indicated, there are different types of adjunct processors, including but not limited to, cryptographic cards or adapters. A specific example of a cryptographic card is a Crypto Express card offered by International Business Machines Corporation, Armonk, N.Y. Although an example cryptographic card is provided, other cryptographic cards offered by International Business Machines Corporation and/or other companies may incorporate and/or use one or more aspects of the present invention. Further, other types of adjunct processors may incorporate and/or use one or more aspects of the present invention.

In one embodiment, an adjunct processor, such as a cryptographic card (e.g., a Crypto Express card), supports a plurality of modes including, but not limited to, a co-processor mode, an accelerator mode, and an Enterprise Public Key Cryptographic Standards (PKCS) mode (e.g., XCP/EP11—Enterprise PKCS #11), as examples. Additional, fewer and/or other modes may be supported in other examples. Each of the modes may have its own AP message structures and formats.

As an example, an adjunct processor message is comprised of multiple data segments and the data segments may not be adjacent to each other; instead, one or more may be interleaved. These data segments are referred to as scatter gather data segments. In one example, a cryptographic card does not have direct access to the enqueued AP message and a portion of the message (e.g., the bottom part of the AP message) contains the data to be used by, e.g., the cryptographic card to execute the AP command. Therefore, the AP command transport layer (e.g., transport layer 110, 160) copies the relevant data from the AP command request message, packages it in a format that the cryptographic card understands (e.g., crypto card's command request message) and sends it to the cryptographic card. Similarly, after the AP command is executed by the cryptographic card, the AP command transport layer generates an AP command reply message using various parts of the AP command request message and the cryptographic card's command reply message and sends it to the AP queue to be dequeued later by the program. Further details of an AP command request message and an AP command reply message are described below, including aspects of the messages used in accordance with command-type filtering of one or more aspects of the present invention.

In accordance with an aspect of the present invention, an adjunct processor (e.g., a cryptographic card) is designed that allows the machine hypervisor to request command-type filtering according to computing policies (e.g., the license terms, permissions and/or resource requirements, such as high availability requirements, of customers; etc.). Since customers have different computing policies associated therewith (e.g., license terms, permissions and/or resource requirements, such as high availability requirements), not all types of commands may be available to a particular customer. Thus, in accordance with an aspect of the present invention, command-type filtering is provided such that a selected adjunct processor (e.g., a cryptographic card configured for a particular mode (e.g., co-processor mode)) is able to be used for customer's with different computing policies and thus, different permissions, without requiring the adjunct processor to be re-configured into a different supported mode.

As an example, an AP command-type filtering facility (APFT) is provided that allows AP commands to be filtered based on one or more selected AP command-type filtering facilities on a per-command basis, in accordance with one or more aspects of the present invention. In one example, the one or more selected AP command-type filtering facilities includes a stateless AP command filtering facility (SAPCF). Aspects of the AP command-type filtering facility and the stateless AP command filtering facility are described herein with respect to a particular architecture, such as the z/Architecture® hardware architecture, offered by International Business Machines Corporation, Armonk, N.Y. One embodiment of the z/Architecture hardware architecture is described in "z/Architecture Principles of Operation," IBM Publication No. SA22-7832-12, Thirteenth Edition, September 2019, which is hereby incorporated herein by reference in its entirety. IBM and Z/ARCHITECTURE are registered trademarks of International Business Machines Corporation in at least one jurisdiction. The z/Architecture hardware architecture, however, is only one example architecture. Aspects of the invention may also be based on other architectures, including, but not limited to, the Intel x86 architectures, other architectures of International Business Machines Corporation, and/or architectures of other companies.

In one example, when the stateless AP command filtering facility is installed, the AP command-type filtering facility is installed. To determine whether the stateless AP command filtering facility is installed, a Process Adjunct Processor Queue instruction is used, in accordance with an aspect of the present invention.

Figure 2A:
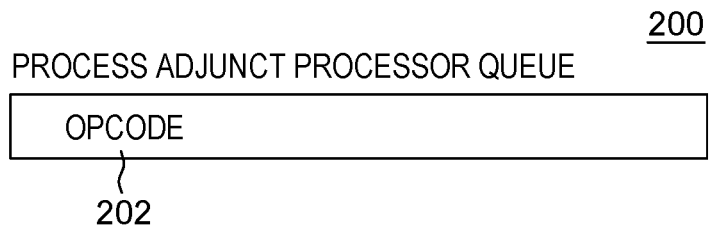
FIGS. 2A-2D depict an example of a Process Adjunct Processor Queue instruction, in accordance with one or more aspects of the present invention.

One example of a Process Adjunct Processor Queue (PQAP) instruction is described with reference to FIG. 2A. As shown, in one example, a Process Adjunct Processor Queue instruction 200 includes an operation code (opcode) 202 (e.g., bits 0-15 of a 32-bit instruction) that indicates a process operation of an adjunct processor queue. In one embodiment, the Process Adjunct Processor Queue instruction employs a plurality of general registers, including general registers 0, 1 and 2. The AP queue designated by the AP queue number (APQN) in general register 0 is processed according to the function code specified in general register 0. Examples of general registers 0, 1 and 2 are further described below.

Figure 1B:
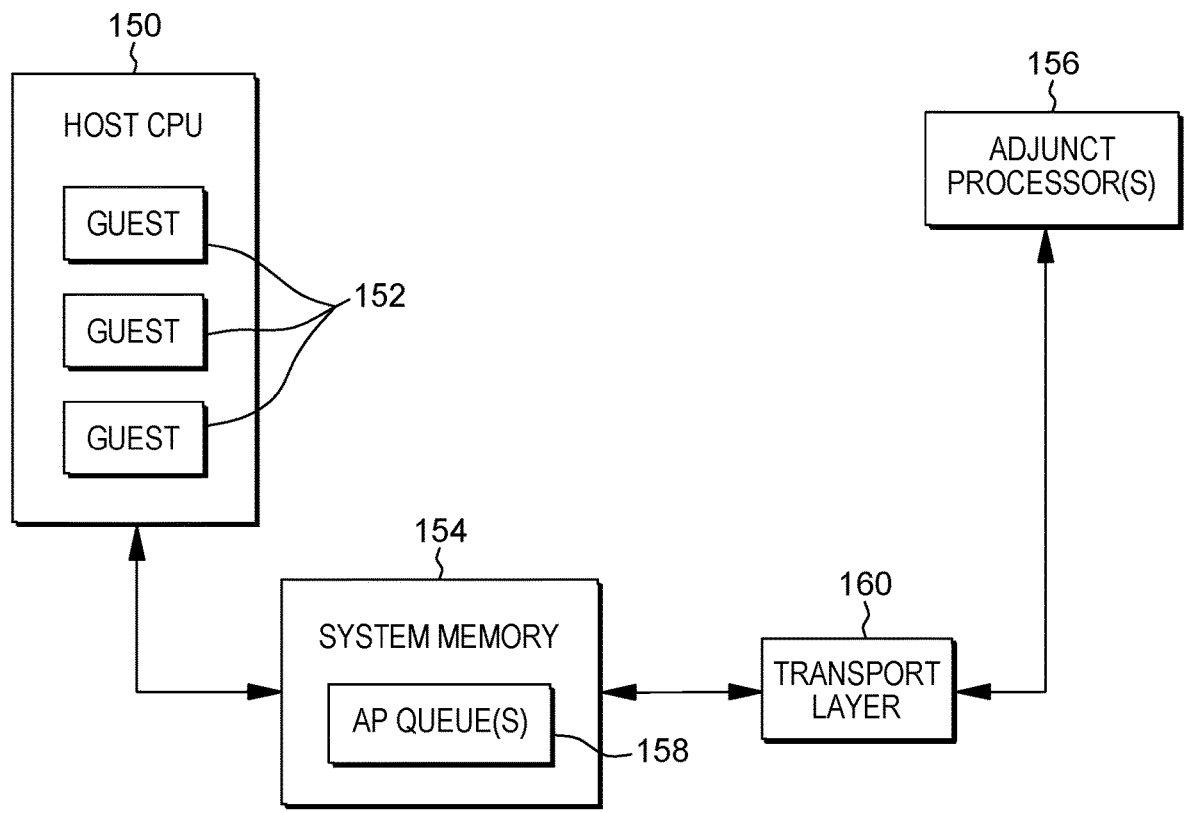
FIG. 1B depicts another example of a computing environment to incorporate and use one or more aspects of the present invention.
Figure 2B:
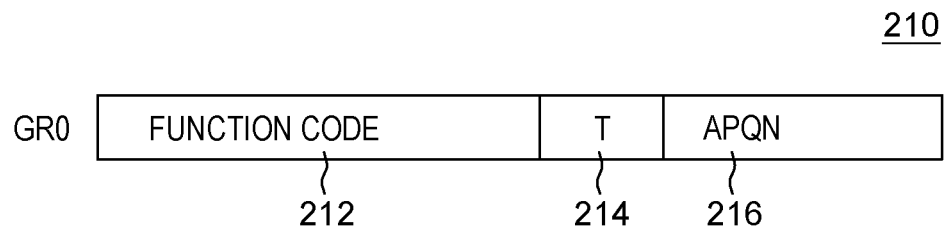

Referring to FIG. 2B, in one embodiment, general register 0 (GR0) 210 is, e.g., a 64-bit register that includes, for instance, a function code (FC) 212 (e.g., bits 32-39) to indicate a selected function to be performed; a test facilities indicator (T) 214 (e.g., bit 40) used to indicate whether a mask of installed facilities is provided in general register 2; and an adjunct processor queue number (APQN) 216 (e.g., bits 48-63) identifying an adjunct processor queue (e.g., AP queue 108 (FIG. 1A); AP queue 158 (FIG. 1B)) processed according to the function code.

Based on issuing the Process Adjunct Processor Queue instruction, function code 212 is to include one of a plurality of acceptable codes, an example of which is code 00 Test AP Queue (TAPQ).

In accordance with one or more aspects of the present invention, when the computing environment is in, e.g., z/Architecture architectural mode, and the APFT facility is installed, if the TAPQ function code is specified (e.g., FC=00 in GR0), bit 40 of general register 0 is defined as the test facilities bit (T) for the TAPQ function. When T is one, bits 0-31 of general register 2 are replaced with a mask of installed AP facilities and other associated information, an example of which is described below. When T is zero, indicating, for instance, that the APFT facility is not installed, the results in general register 2 are confined to, e.g., bit positions 32-63, and bit positions 0-31 are ignored and unchanged. In this case, the AT and QD fields (described below) are valid and the other bit positions are stored as zeros.

As indicated, in addition to general register 0, general registers 1 and 2 are used by the Process Adjunct Processor Queue instruction, each of which is further described herein.

Figure 2C:
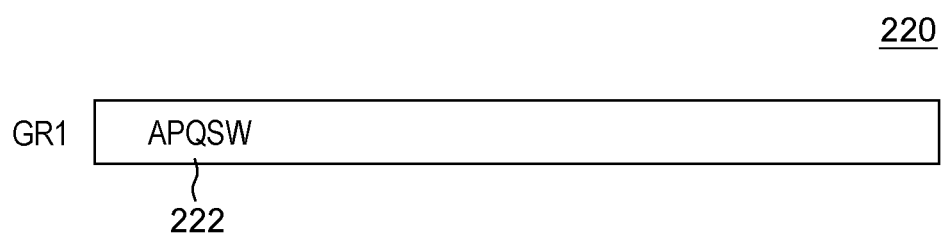

Referring to FIG. 2C, in one embodiment, general register 1 (GR1) 220 is, e.g., a 64-bit register that includes, for instance, an adjunct processor queue status word (APQSW) 222 (e.g., bits 32-63). At completion of the Process Adjunct Processor Queue instruction, the APQSW field contains an AP queue status word unless stated otherwise for a particular function. The AP queue status word indicates, e.g., the state of the AP queue at the completion of the instruction.

Figure 2D:
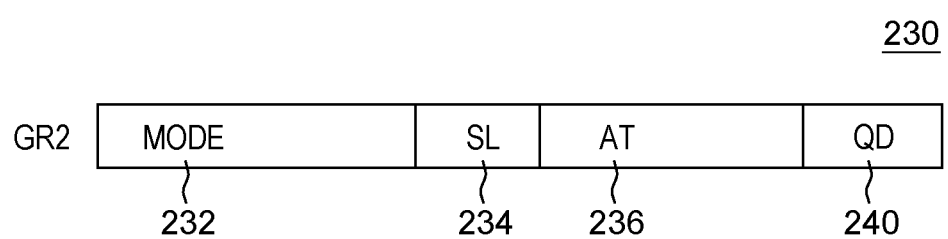

Further, with reference to FIG. 2D, in one embodiment, general register 2 (GR2) 230 is, e.g., a 64-bit register that includes a plurality of fields. As described herein, in one embodiment, bit positions 0-31, when set, include a mask of installed AP facilities and other associated information. Example fields of GR2, in accordance with one or more aspects of the present invention include, for instance:

Mode 232: When set, this field (e.g., bits 3-5) indicates a plurality of possible AP mode facilities. For instance, when D (e.g., bit 3) is one, the specified AP provides the co-processor mode facility; when A (e.g., bit 4) is one, the specified AP provides the accelerator mode facility; and when X (e.g., bit 5) is one, the specified AP provides the XCP mode facility;

SL 234: When this field (e.g., bit 7) is one, the stateless AP command filtering facility (SAPCF) of one or more aspects of the present invention is installed. The SAPCF facility is, for instance, a PCI-X (Peripheral Component Interconnect eXtended) crypto device feature and it is installed in, e.g., z/Architecture architectural mode, in one embodiment;

Other facilities and/or information related to one or more facilities that may be supported by the computing environment may be indicated by one or more bits of the mask in, e.g., bits 0-31.

Adjunct Processor Type (AT) 236: This field (e.g., bit positions 32-39) includes example valid AP-type values in the range of, e.g., 0-255 indicating various AP types;

Number of AP Queue Entries (QD) 240: The number of queue entries on each AP queue in the configuration. QD is a value in the range, e.g., 0-31, representing a number of queue entries in the range, e.g., 1-32 decimal, as an example.

In one example, the installed facility information returned in general register 2 applies to all APs of the same AP type and—for consolidated APs (e.g., AP type 10 or higher)—in the same configuration mode. The installed facility information is, in one example, persistent at least until the next subsystem reset. A facility may be concurrently added. A facility may or may not be concurrently removed when the last AP of an AP type is deconfigured.

General register 2 is modified as defined when the TAPQ function completes with, e.g., condition code 0 (successful completion); or condition code 3, response codes, e.g., 02-05 (unexpected conditions; e.g., AP queue reset in progress, AP deconfigured, AP checkstop, AP busy). Otherwise general register 2 is not modified.

Although specific fields, locations of fields, sizes of fields, bits and values of fields or bits are described in one embodiment herein for the Process Adjunct Processor Queue instruction and its associated registers, other fields, locations of fields, sizes of fields, bits and/or values of fields or bits may be used without departing from a spirit of one or more aspects of the invention. Fields and/or bits of each of the general registers not described herein may be blank, have a predefined value (e.g., zero), and/or include values to be ignored in one embodiment. Many possibilities exist.

In accordance with one or more aspects, the adjunct processor (e.g., crypto card) has logic that recognizes attributes of different types of commands. The different types of commands are provided, in one embodiment, by a hypervisor. The hypervisor determines, for instance, a set of command-type tags based on, e.g., a set of customers from which command requests may be received. For example, the types of commands to be represented by the set of command-type tags are based on, e.g., the computing policies (e.g., licensing terms; permissions; resource requirements, such as, e.g., high availability requirements; etc.) of the customers from which command requests are to be received.

In one example, a command has a set of tags (e.g., policy or filtering tags) associated therewith that represents the attributes of the command. A command may have multiple tags associated therewith for multiple command-types, and therefore, the set of tags includes one or more tags depending on the command types for which the command is associated. For instance, a command may have a stateless command-type tag to indicate that the command is a valid stateless command type-command, a master-key command-type tag, to indicate that the command is a valid master-key command-type command, etc. An indication of the set of command-type tags is obtained (e.g., provided, received, retrieved, etc.) by the adjunct processor. In one example, the adjunct processor receives a set of command-type tags that includes a tag for secure-key command-type commands (e.g., used to disable secure-key commands when requested by the caller); and a tag for stateless command-type commands. In other embodiments, the hypervisor provides other tags for other filtering techniques, such as other command-type filtering techniques. Many possibilities exist.

Further, in one embodiment, a command request is configured to include one or more filtering indicators, such as one or more command-type filtering indicators, used to provide per-command filtering, in accordance with one or more aspects of the present invention. Further details regarding selected command-type filtering indicators included in a command request are described with reference to FIGS. 3A-3B.

Figure 3A:
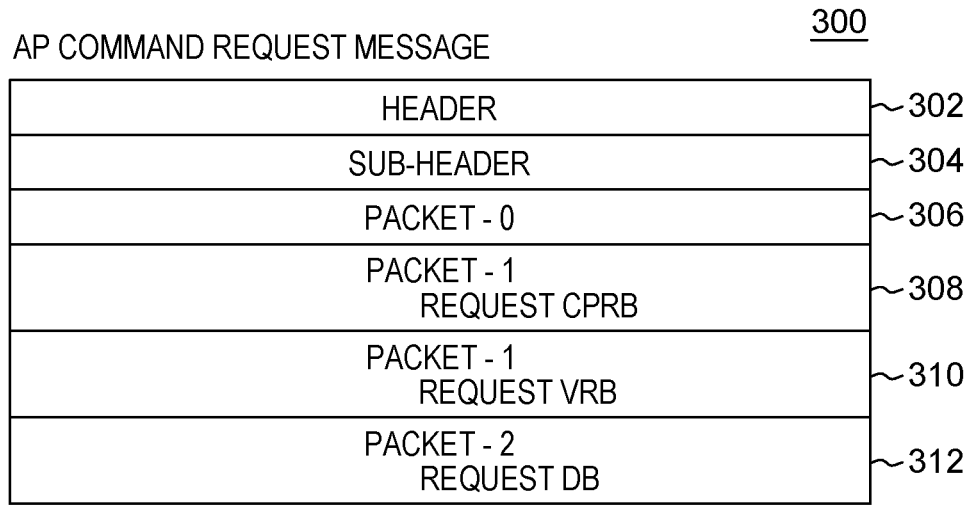
FIG. 3A depicts one example of an Adjunct Processor Command Request Message, in accordance with one or more aspects of the present invention.

Referring to FIG. 3A, in one example, an AP command request message 300 includes a header 302, a sub-header 304, and a plurality of packets 306-312. In one example, one or more of the packets (e.g., one or more of packet-1 308-310) is configured to provide a command and one or more of the packets (e.g., packet-2 312) is configured to provide input data. One of the packets includes a request connectivity programming request block (CPRB) 308 that includes one or more filtering indicators related to command-type filtering, in accordance with an aspect of the present invention.

Figure 3B:
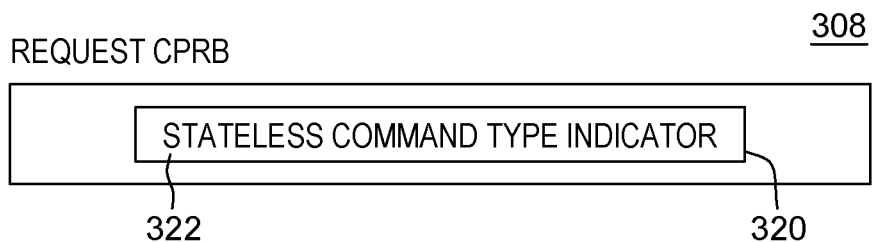
FIG. 3B depicts one example of a Request Connectivity Programming Request Block (CPRB), in accordance with one or more aspects of the present invention.

For instance, as shown in FIG. 3B, request CPRB 308 includes an AP command filter mask 320 that includes one or more command-type filtering indicators. One example of a command-type filtering indicator is a stateless command type indicator 322. This indicator indicates whether the allowed command set is for stateless command-type commands (e.g., indicator 322, such as a selected bit, set to one) or for the full command set (e.g., indicator 322 set to zero). Other indicators, flags, bits, etc., may be included in the request CPRB 308 to indicate other types of commands that may be filtered. For instance, another indicator may indicate filtering based on master keys. Many other examples are possible.

Figure 3C:
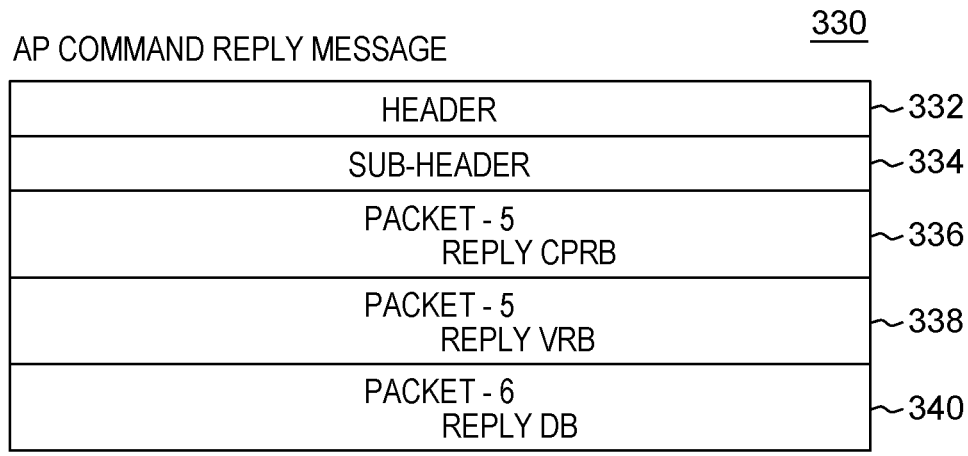
FIG. 3C depicts one example of an Adjunct Processor Command Reply Message, in accordance with one or more aspects of the present invention.

In response to a message, a reply is provided, and in one example, is in the form of an AP command reply message, an example of which is depicted in FIG. 3C. As shown, an AP command reply message 330 includes, for instance, a header 332, a sub-header 334, and a plurality of packets 336-340. One of the packets includes a reply CPRB 336 that includes a reply to the request and may indicate an error, in accordance with an aspect of the present invention.

Figure 3D:
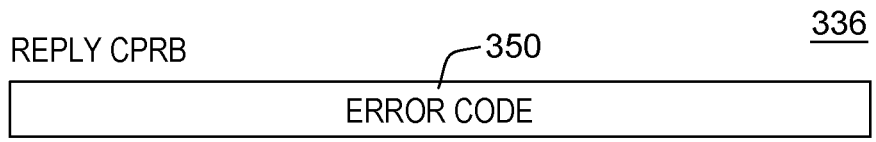
FIG. 3D depicts one example of a Reply Connectivity Programming Request Block (CPRB), in accordance with one or more aspects of the present invention.

For instance, as shown in FIG. 3D, reply CPRB 336 includes an error indication. The error indication may include an error code 350 (e.g., CPRB return_code/reason_code) to report that a customer requested command is not allowed by a defined set of command-type tags (e.g., imposed by a hypervisor or another entity).

Figure 4:
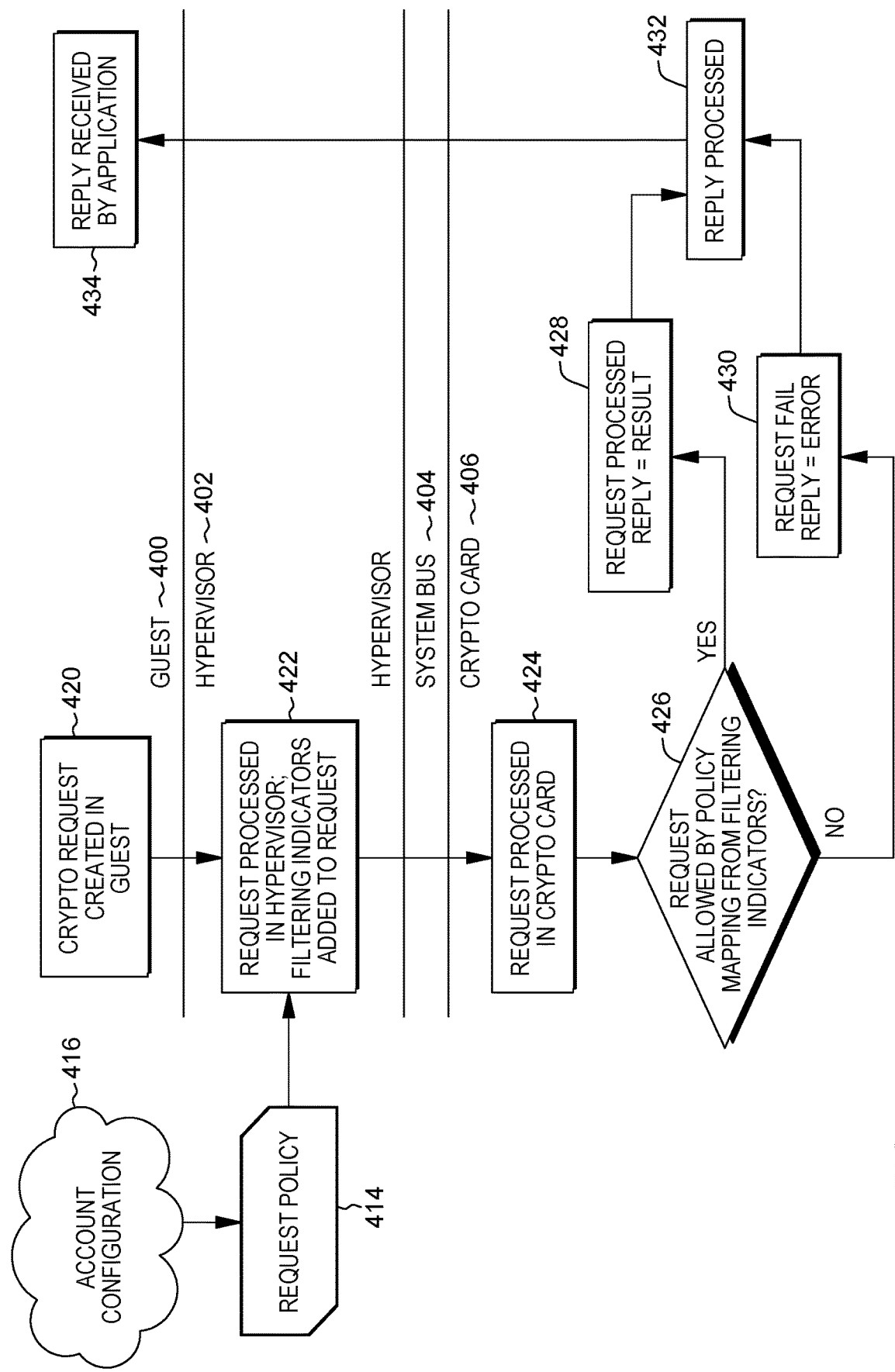
FIG. 4 depicts one example of a flow to provide per-command filtering, in accordance with one or more aspects of the present invention.

As described herein, the command request/reply messages are used in accordance with an aspect of the present invention to provide command-type filtering on a per-command basis. Further details regarding per-command command-type filtering are described with reference to FIG. 4. In the example of FIG. 4, the computing environment is a cloud environment; however, in other embodiments, the computing environment is a non-cloud environment. Aspects of the invention are not limited to a particular computing environment. Further, in the example of FIG. 4, the adjunct processor is a cryptographic card. However, filtering may be used by other adjunct processors; cryptographic card is only one example.

Referring to FIG. 4, in one embodiment, a cryptographic request is created by a requester, such as a guest 400 (e.g., guest application or guest operating system in, e.g., a cloud environment), STEP 420. In one example, an AP command request message 300 is encoded, and provided to a hypervisor 402.

The cryptographic request is obtained (e.g., received, retrieved, provided, etc.) by hypervisor 402 from guest 400 and processed, STEP 422. In accordance with an aspect of the present invention, the hypervisor adds (or sets) one or more filtering indicators, such as command-type filtering indicators, to the request based on a request policy 414 (e.g., a cloud request policy). Request policy 414 includes, for instance, an indication for each requester (e.g., guest; caller; customer) permissible command types to be processed for the requester based on the requester's computing policy (e.g., license terms; resource requirements, such as high availability requirements; and/or permissions; etc.) provided by account configuration 416 (e.g., a cloud account configuration).

As an example, hypervisor 402 determines, based on the request policy (which is based on the guest's computing policy), whether stateless command type indicator 322 (or another filtering indicator) is to be set to a select value, e.g., one (e.g., a reduced command set allowed, such as only stateless command-type commands allowed) or to another select value, e.g., zero (e.g., full command set allowed). The hypervisor sets stateless command type indicator 322 (and/or other filtering indicators in other examples) based on the determination.

Hypervisor 402 provides the modified request message (i.e., the request message with the set filtering indicator(s)) to an adjunct processor (e.g., cryptographic card 406). For instance, hypervisor 402 sends or forwards the request message to the adjunct processor via, for instance, a system bus 404; or the adjunct processor otherwise obtains (e.g., retrieves) the request message via system bus 404.

The adjunct processor, such as cryptographic card 406, in this example, processes the request, STEP 424. The processing includes determining whether the request is allowed using, e.g., the command-type filtering indicators included in the request, INQUIRY 426. For instance, if stateless command type indicator 322 in the received request message is set to one value, e.g., one, indicating this requester (e.g., guest) is authorized for, e.g., stateless command-type commands, and the command is a stateless command-type command, as indicated by one or more tags (e.g., policy or filtering tags) associated with the command, then the request is valid. However, if the command is a non-stateless command-type command and indicator 322 is set to the one value (e.g., one), the command is an invalid command for this requester. Similarly, if indicator 322 is set to another value (e.g., zero), then if the command is included in the full command set, as indicated by the command-type policy tags, it is considered valid.

If the request is allowed, it is processed (e.g., operations of command are performed), STEP 428; otherwise, an error is provided, STEP 430. A reply is processed by the adjunct processor (e.g., cryptographic card), STEP 432, which includes placing the reply in an AP command reply message, and it is sent to guest 400 via, for instance, a transport layer (e.g., transport layer 110, 160). The reply may include results of the processing, a condition code, a return code, a reason code, and/or an error indication (e.g., error code in reply CPRB 336), as examples. Guest 400 receives the reply, STEP 434.

As described herein, in one embodiment, an adjunct processor (e.g., a crypto card) receives a command request message from a requester (e.g., a guest) and determines whether the command is allowed to be executed based on a hypervisor imposed set of command-type indicators (e.g., command-type filtering indicators) in the CPRB request block. The hypervisor imposed set of command-type filtering indicators are used in per-command filtering. For instance, the adjunct processor executes the command if it is determined to be valid based on, e.g., the command-type filtering indicators, and the results are placed in a command reply message, which is sent to the caller. If the command is determined to be invalid, an error code is placed in the CPRB of the command reply message and returned to the caller.

One or more aspects of the present invention are inextricably tied to computer technology and facilitate processing, including command processing, within a computing environment, improving performance thereof. Further details of one embodiment of aspects related to facilitating processing within a computing environment are described with reference to FIGS. 5A-5B.

Referring to FIG. 5A, in one embodiment, an adjunct processor dynamically determines whether commands obtained by the adjunct processor are to be processed by the adjunct processor (500). The dynamically determining is performed on a per-command basis (502), and includes, for instance, obtaining by the adjunct processor, a command request of a requester (504). The command request includes at least one filtering indicator indicating at least one valid command type for processing by the adjunct processor for the requester (506). The adjunct processor determines, using the at least one filtering indicator, whether a command of the command request is valid for processing by the adjunct processor for the requester (508). The adjunct processor processes the command, based on determining that the command is valid for processing by the adjunct processor for the requester (510).

By dynamically determining on a per-command basis whether an adjunct processor can process a particular command, flexibility is provided in command processing. A command is either valid or invalid at command processing time, and thus, the program does not have to switch between various adjunct processors to execute different types of commands. This reduces program complexity, providing more efficient code and improving code execution time and performance.

In one embodiment, the adjunct processor is configured in one mode and the dynamically determining enables it to operate differently than the one mode in which it is configured (512). As an example, the adjunct processor configured in the one mode is able to process a set of commands (514), and the adjunct processor operates differently in that it processes a reduced set of the set of commands (516). The adjunct processor is able to switch filtering modes dynamically for each command, since command-type filtering is provided on a per-command basis. This allows a particular adjunct processor to be used in different modes. For instance, the adjunct processor may be configured in one mode but is able to operate in a different mode without reconfiguring the adjunct processor. Further, by enabling an adjunct processor to operate in different modes, the expense of additional adjunct processors is saved, and flexibility is provided within the system.

Figure 5B:
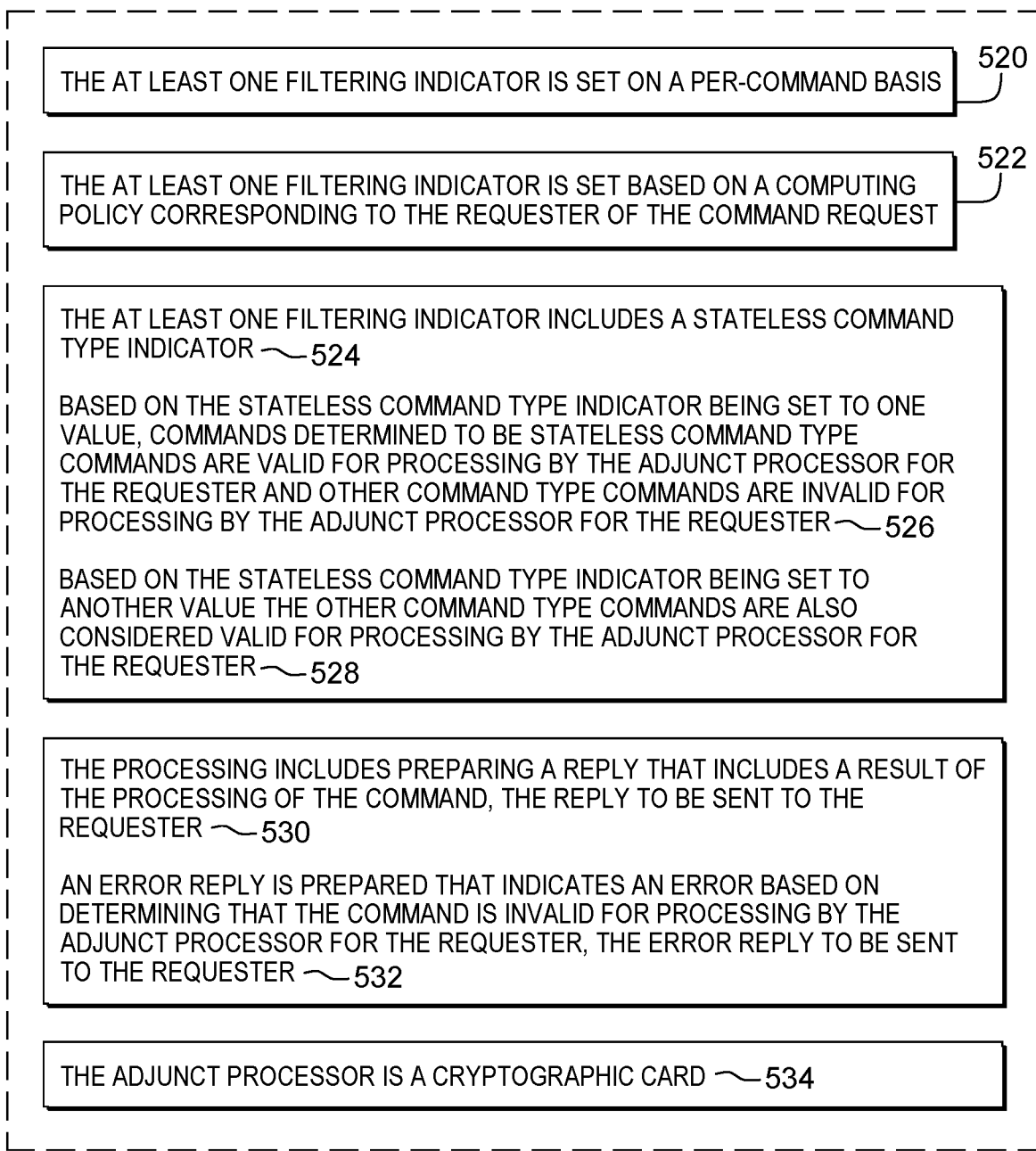

Further, referring to FIG. 5B, in one embodiment, the at least one filtering indicator is set on a per-command basis (520). By providing a per-command filtering indicator, flexibility in command processing is provided, as well as reduced code complexity, increased performance, and reduced expenses since fewer adjunct processors may be needed.

In one embodiment, the at least one filtering indicator is set based on a computing policy corresponding to the requester of the command request (522). This allows the particular licensing attributes, permissions and/or customer requirements to be considered in command processing.

As an example, the at least one filtering indicator includes a stateless command type indicator (524). Based on the stateless command type indicator being set to one value, commands determined to be stateless command type commands are valid for processing by the adjunct processor for the requester and other command type commands are invalid for processing by the adjunct processor for the requester (526). Based on the stateless command type indicator being set to another value, the other command type commands are also considered valid for processing by the adjunct processor for the requester (528). This allows an adjunct processor configured in a mode that provides a full set of commands to be used to provide selective commands instead of the full set of commands for one or more requesters, and the full set of commands for other requesters. This provides flexibility, reduced code complexity, increased performance, and reduced expenses since fewer adjunct processors may be needed.

In one embodiment, the processing includes preparing a reply that includes a result of the processing of the command, the reply to be sent to the requester (530). Further, in one example, an error reply is prepared that indicates an error based on determining that the command is invalid for processing by the adjunct processor for the requester, the error reply to be sent to the requester (532). The error reply informs the requester that the command is an invalid command type.

Further, as one example, the adjunct processor is a cryptographic card (534).

Other variations and embodiments are possible.

Command-type filtering of one or more aspects of the present invention may be incorporated and used in many computing environments. One example computing environment is described with reference to FIG. 6A. As an example, the computing environment is based on the z/Architecture® hardware architecture, offered by International Business Machines Corporation, Armonk, N.Y. The z/Architecture hardware architecture, however, is only one example architecture. The computing environment may also be based on other architectures, including, but not limited to, the Intel x86 architectures, other architectures of International Business Machines Corporation, and/or architectures of other companies.

Figure 6A:
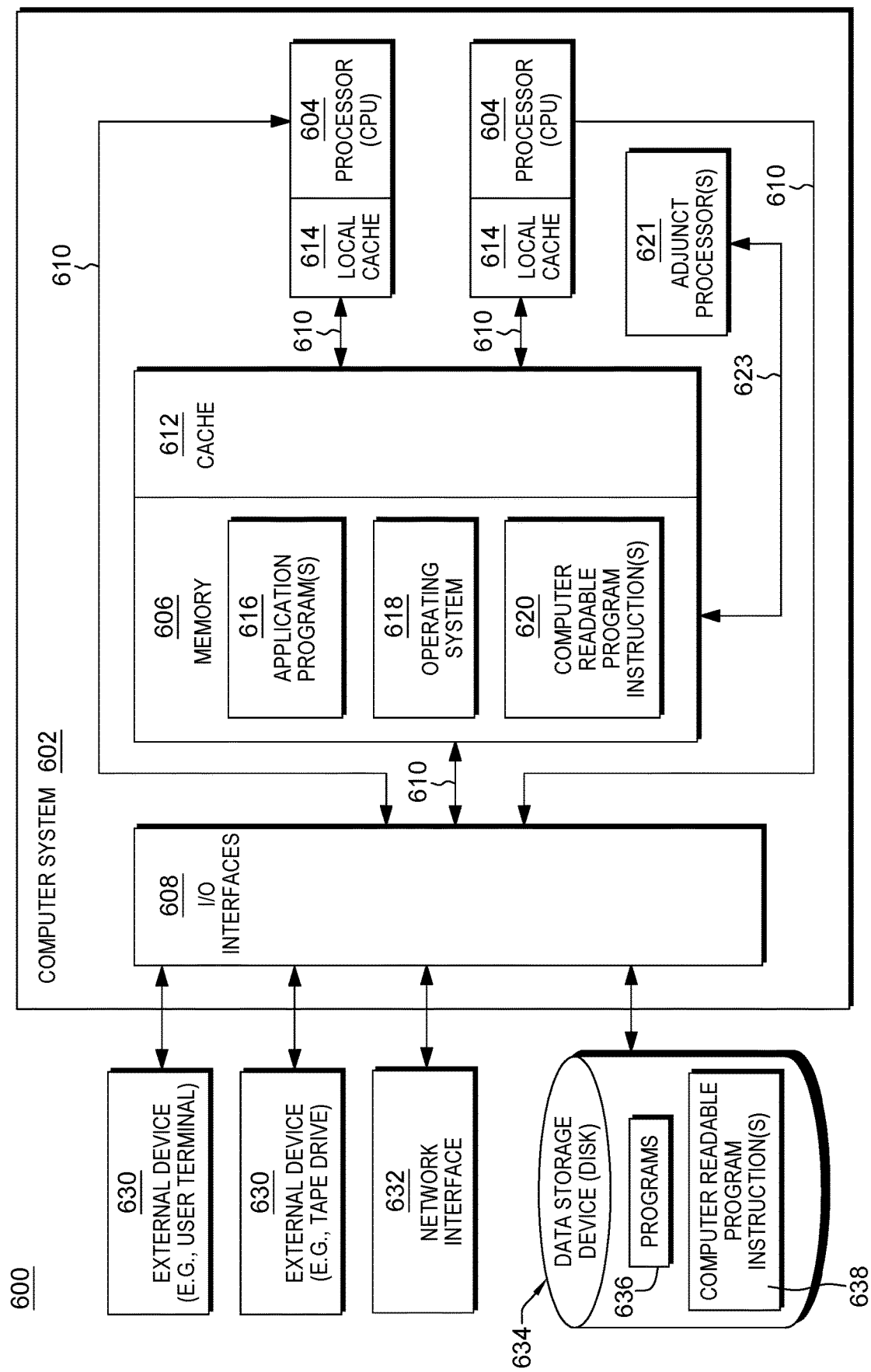
FIG. 6A depicts one example of a computing environment to incorporate and use one or more aspects of the present invention.

As shown in FIG. 6A, a computing environment 600 includes, for instance, a computer system 602 shown, e.g., in the form of a general-purpose computing device. Computer system 602 may include, but is not limited to, one or more processors or processing units 604 (e.g., central processing units (CPUs)), a memory 606 (a.k.a., system memory, main memory, main storage, central storage or storage, as examples), and one or more input/output (I/O) interfaces 608, coupled to one another via one or more buses and/or other connections 610.

Bus 610 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 606 may include, for instance, a cache 612, such as a shared cache, which may be coupled to local caches 614 of processors 604. Further, memory 606 may include one or more programs or applications 616, at least one operating system 618, and one or more computer readable program instructions 620. Computer readable program instructions 620 may be configured to carry out functions of embodiments of aspects of the invention.

In one embodiment, memory 606 (e.g., at least a hardware system area of memory 606) is coupled to one or more adjunct processors 621 via one or more adjunct processor buses 623, and in one or more embodiments, via an AP transport layer.

Computer system 602 may communicate via, e.g., I/O interfaces 608 with one or more external devices 630, such as a user terminal, a tape drive, a pointing device, a display, and one or more data storage devices 634, etc. A data storage device 634 may store one or more programs 636, one or more computer readable program instructions 638, and/or data, etc. The computer readable program instructions may be configured to carry out functions of embodiments of aspects of the invention.

Computer system 602 may also communicate via, e.g., I/O interfaces 608 with network interface 632, which enables computer system 602 to communicate with one or more networks, such as a local area network (LAN), a general wide area network (WAN), and/or a public network (e.g., the Internet), providing communication with other computing devices or systems.

Computer system 602 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 602. Examples, include, but are not limited to: microcode, device drivers, redundant processing units, external disk drive arrays, RAID systems, tape drives, and data archival storage systems, etc.

Computer system 602 may be operational with numerous other general-purpose or special purpose computing system environments or configurations. Examples of well-known computing systems, environments, and/or configurations that may be suitable for use with computer system 602 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 6B:
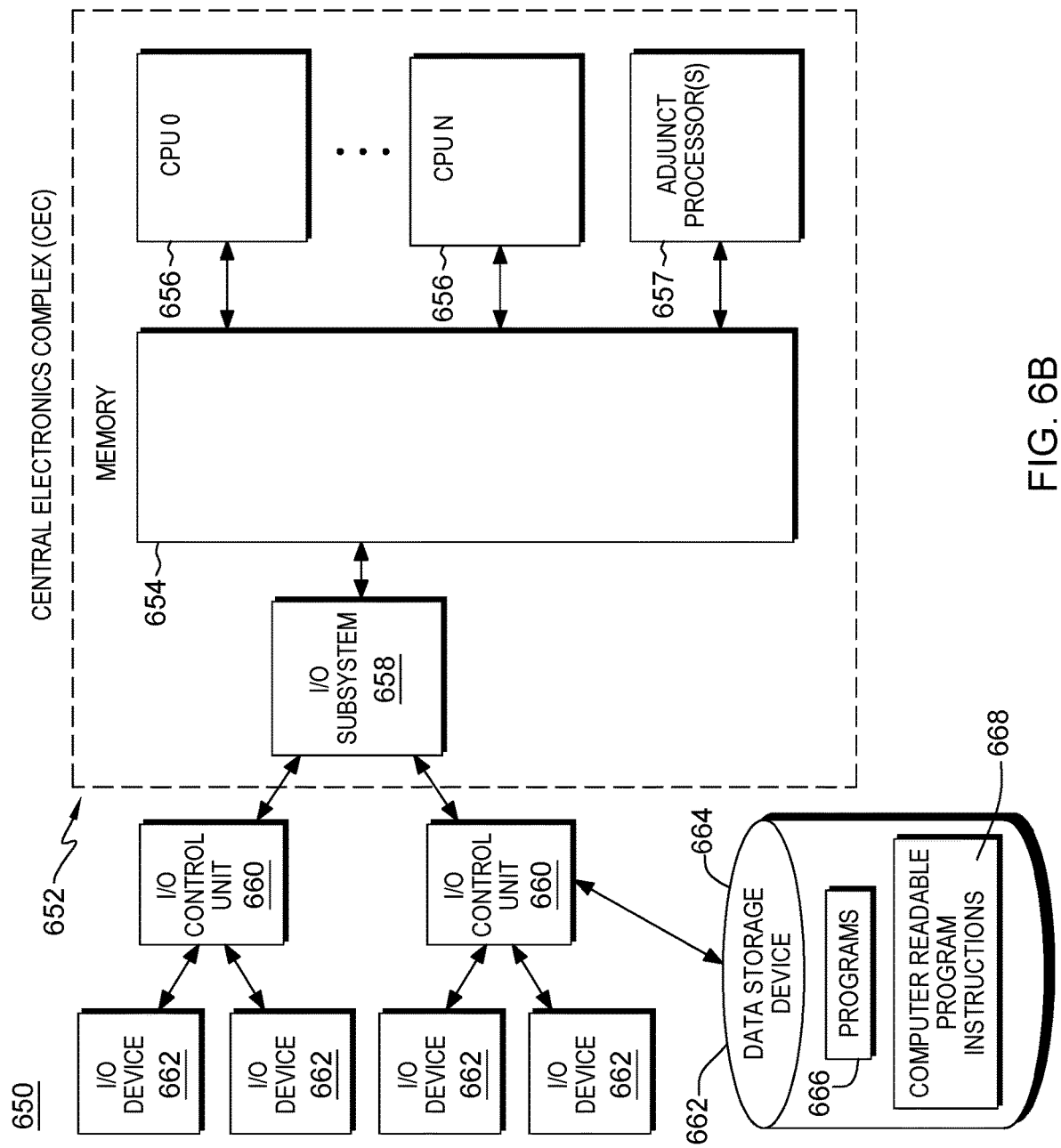
FIG. 6B depicts another example of a computing environment to incorporate and use one or more aspects of the present invention.

Another example of a computing environment to incorporate and use one or more aspects of the present invention is described below with reference to FIG. 6B. As an example, the computing environment of FIG. 6B can be based on the z/Architecture® hardware architecture offered by International Business Machines Corporation. The z/Architecture hardware architecture, however, is only one example architecture. Again, the computing environment may also be based on other architectures, including, but not limited to, the Intel x86 architectures, other architectures of International Business Machines Corporation, and/or architectures of other companies.

In one example, a computing environment 650 includes a central electronics complex (CEC) 652. CEC 652 includes a plurality of components, such as, for instance, a memory 654 (a.k.a., system memory, main memory, main storage, central storage, storage) coupled to one or more processors (a.k.a., central processing units (CPUs)) 656 and to an input/output (I/O) subsystem 658. Further, in one embodiment, memory 654 (e.g., at least a hardware system area of memory 654) is coupled to one or more adjunct processors 657 via one or more adjunct processor buses and, in one or more embodiments, via an AP transport layer.

I/O subsystem 658 can be a part of the central electronics complex or separate therefrom. It directs the flow of information between main storage 654 and input/output control units 660 and input/output (I/O) devices 662 coupled to the central electronics complex.

Many types of I/O devices may be used. One particular type is a data storage device 664. Data storage device 664 can store one or more programs 666, one or more computer readable program instructions 668, and/or data, etc. The computer readable program instructions can be configured to carry out functions of embodiments of aspects of the invention.

Central electronics complex 652 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 652. Examples include, but are not limited to: microcode, device drivers, redundant processing units, external disk drive arrays, RAID systems, tape drives, and data archival storage systems, etc.

Further, central electronics complex 652 can be operational with numerous other general-purpose or special-purpose computing system environments or configurations. Examples of well-known computing systems, environments, and/or configurations that may be suitable for use with central electronics complex 652 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 6D:
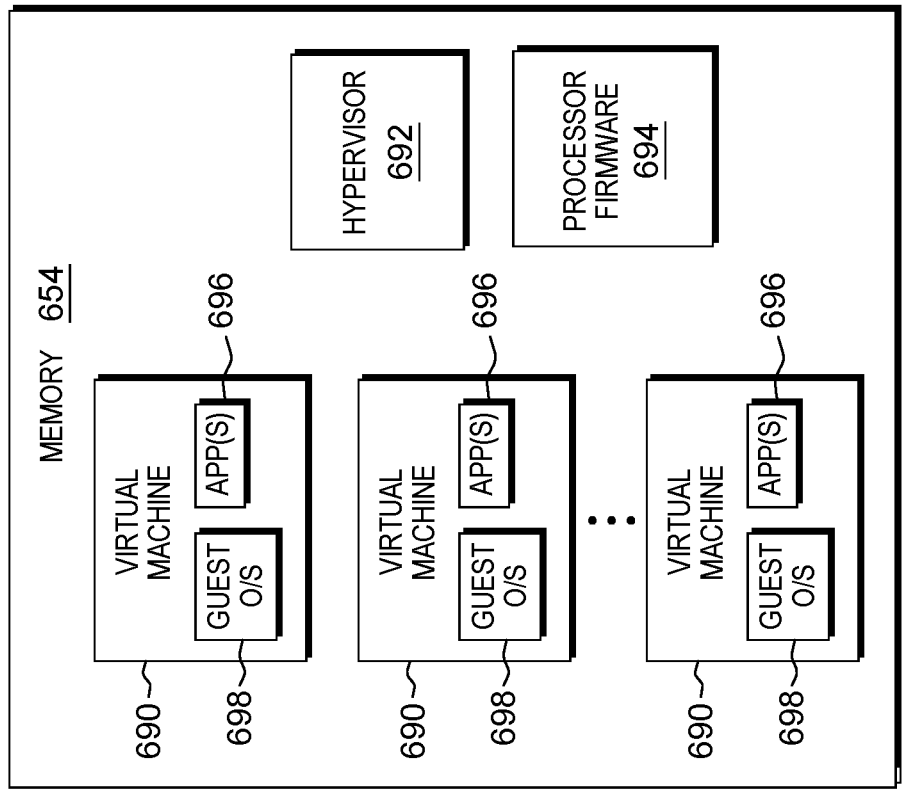
FIG. 6D depicts another example of further details of a memory of FIG. 6B, in accordance with one or more aspects of the present invention.
Figure 6C:
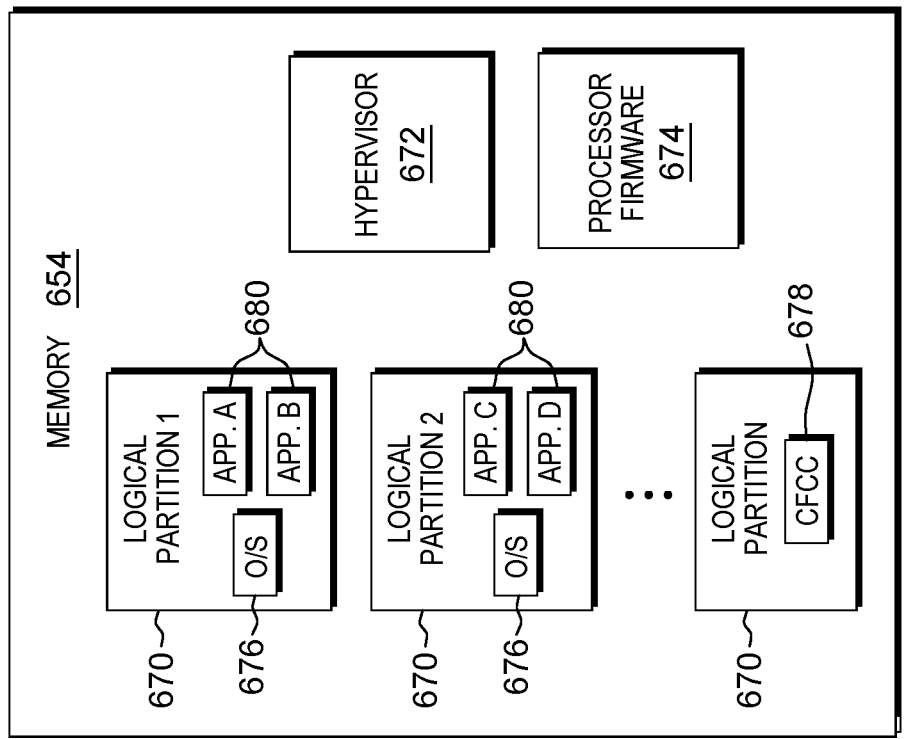
FIG. 6C depicts one example of further details of a memory of FIG. 6B, in accordance with one or more aspects of the present invention.

Central electronics complex 652 provides in one or more embodiments logical partitioning and/or virtualization support. In one embodiment, as shown in FIG. 6C, memory 654 includes, for example, one or more logical partitions 670, a hypervisor 672 that manages the logical partitions, and processor firmware 674. One example of hypervisor 672 is the Processor Resource/System Manager (PR/SM), offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 670 is capable of functioning as a separate system. That is, each logical partition can be independently reset, run a guest operating system 676 such as the z/OS® operating system, offered by International Business Machines Corporation, Armonk, N.Y., or other control code 678, such as coupling facility control code (CFCC), and operate with different programs 680. An operating system or application program running in a logical partition appears to have access to a full and complete system, but in reality, only a portion of it is available. Although z/OS is offered as an example, other operating systems may be used in accordance with one or more aspects of the present invention.

Memory 654 is coupled to CPUs 656 (FIG. 6B), which are physical processor resources that can be allocated to the logical partitions. For instance, a logical partition 670 includes one or more logical processors, each of which represents all or a share of a physical processor resource 656 that can be dynamically allocated to the logical partition.

In yet a further embodiment, the central electronics complex provides virtual machine support (either with or without logical partitioning support). As shown in FIG. 6D, memory 654 of central electronics complex 652 includes, for example, one or more virtual machines 690, a virtual machine manager, such as a hypervisor 692, that manages the virtual machines, and processor firmware 694. One example of hypervisor 692 is the z/VM® hypervisor, offered by International Business Machines Corporation, Armonk, N.Y. The hypervisor is sometimes referred to as a host. z/OS and z/VM are trademarks or registered trademarks of International Business Machines Corporation in at least one jurisdiction.

The virtual machine support of the CPC provides the ability to operate large numbers of virtual machines 690, each capable of operating with different programs 696 and running a guest operating system 698, such as the Linux® operating system. Each virtual machine 690 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 7A:
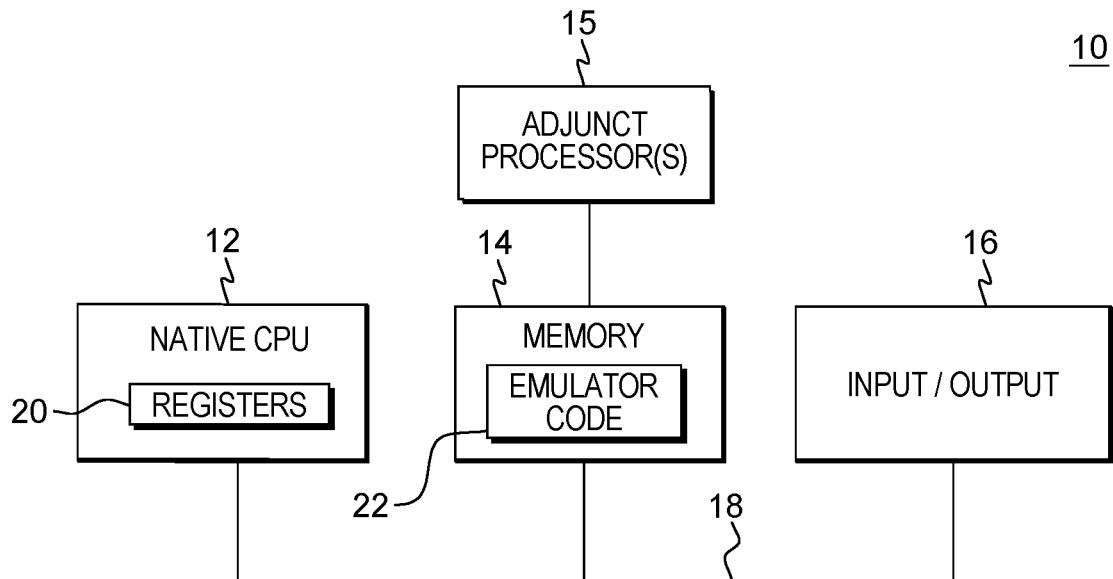
FIG. 7A depicts another example of a computing environment to incorporate and use one or more aspects of the present invention.

Another embodiment of a computing environment to incorporate and use one or more aspects of the present invention is described with reference to FIG. 7A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 7B:
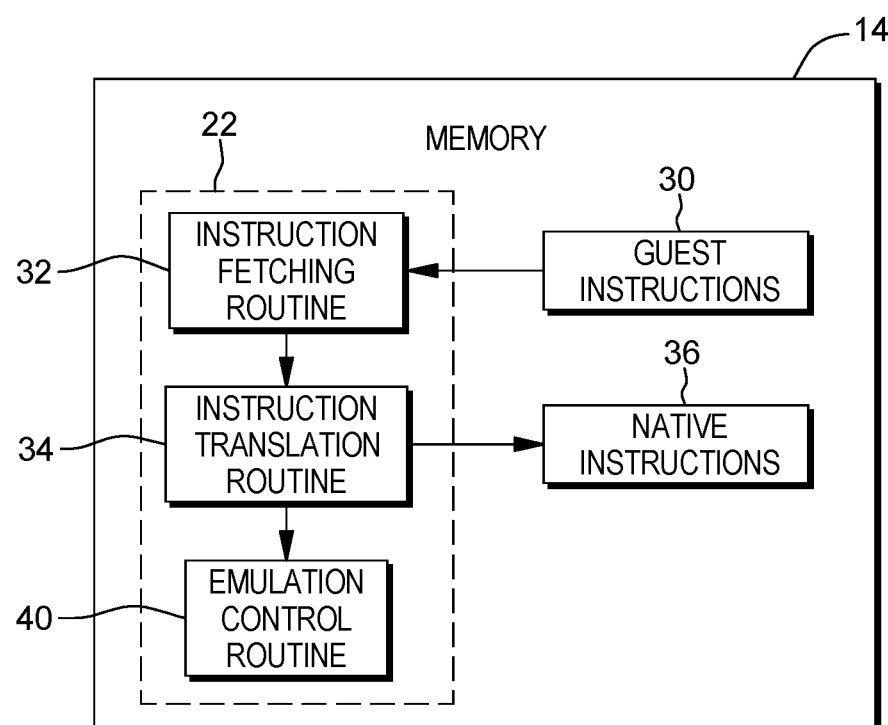
FIG. 7B depicts further details of the memory of FIG. 7A, in accordance with one or more aspects of the present invention.

Further details relating to emulator code 22 are described with reference to FIG. 7B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

Further, in one embodiment, computing environment 10 includes one or more adjunct processors 15 coupled to memory 14. The one or more adjunct processors are defined in one architecture and are configured to emulate another architecture. For example, an adjunct processor obtains guest commands of the architecture being emulated, translates the guest commands into native commands of the one architecture and executes the native commands.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured for per-command filtering, in accordance with one or more aspects of the present invention.

As described herein, in one or more aspects, command-type filtering on a per-command basis is provided. Many filtering techniques, including many command-type filtering techniques, may be used. In one particular example, stateless command-type filtering is provided. With this filtering, in one example, if the stateless command filtering facility is set to, e.g., zero, then the stateless command filtering facility is not installed and the adjunct processor (e.g., crypto card) allows the commands that are supported by the adjunct processor to be executed; otherwise, the stateless command filtering facility is installed and whether a command is executed by the adjunct processor is dependent on, at least, the value of the hypervisor imposed set of command-type filtering indicator(s) in a command request. An example embodiment that includes a stateless command type indicator in the command request message is described below:

If the stateless command type indicator (e.g., indicator 322) is set to zero in the command request message (e.g., message 300), the crypto card allows all the commands that are supported by the crypto card to be executed. If the stateless command type indicator (e.g., indicator 322) is set to one in the command request message (e.g., message 300), the crypto card does not allow all the commands that are supported by the crypto card to be executed. If the command in the command request message is a stateless command-type command, then the command is executed. If the command in the command request message is not a stateless command-type command, then the command is rejected with an error code in the CPRB (e.g., reply CPRB 336) of the command reply message (e.g., message 330).

In one or more aspects, the configured mode of the crypto card (e.g., co-processor mode) can be used to either provide the stateless command filtering (also referred to as a non-secure-key filtering mode; e.g., only stateless command-type commands are processed) or another filtering mode with a reduced set of commands without configuring the crypto card in a new crypto card mode, like, e.g., the accelerator mode. The filtering technique may be used to filter a set of command-type commands, such as stateless command-type commands or other command-type commands in other examples, such as master key management commands, etc. This reduces the number of adjunct processors to be purchased and managed.

Furthermore, one or more aspects of the invention provide the capability to switch the filtering mode dynamically for each command; the command-type filtering is done on a per-command basis. Therefore, each command may be either valid or invalid at command processing time based on the command-type flags values (e.g., command-type filtering indicators). The program does not have to switch between various crypto card modes to execute different filtering command sets. Therefore, the complexity of managing and using the number of crypto cards remains the same regardless of the number of supported filtering modes. The reduction in program complexity also adds to more efficient code and improves code execution time and performance.

In a further embodiment, to provide the filtering functionality, a list of actual command codes or mnemonics are used, along with their function codes or mnemonics to communicate the supported command codes and/or their function codes.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
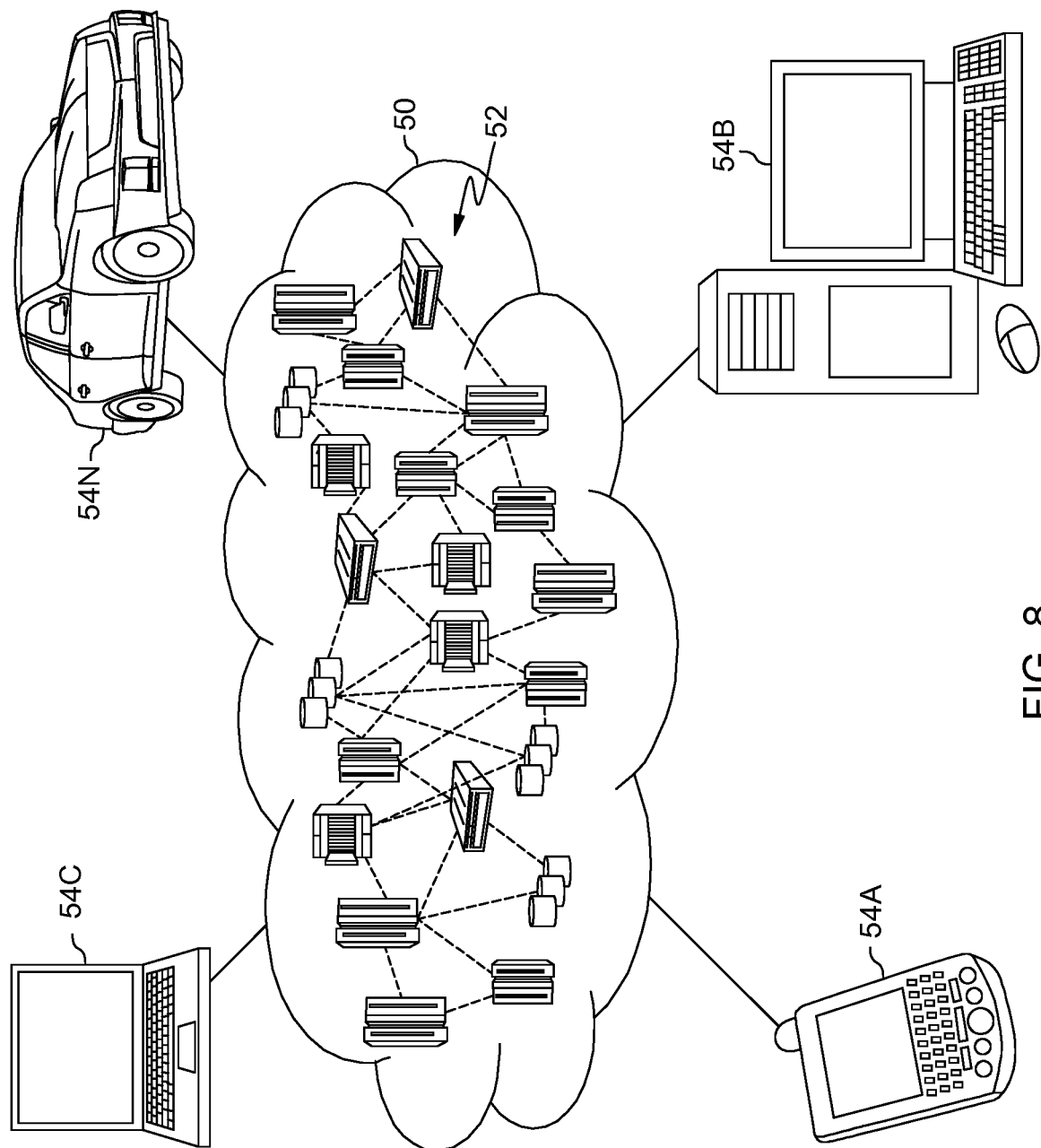
FIG. 8 depicts one embodiment of a cloud computing environment, in accordance with one or more aspects of the present invention.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
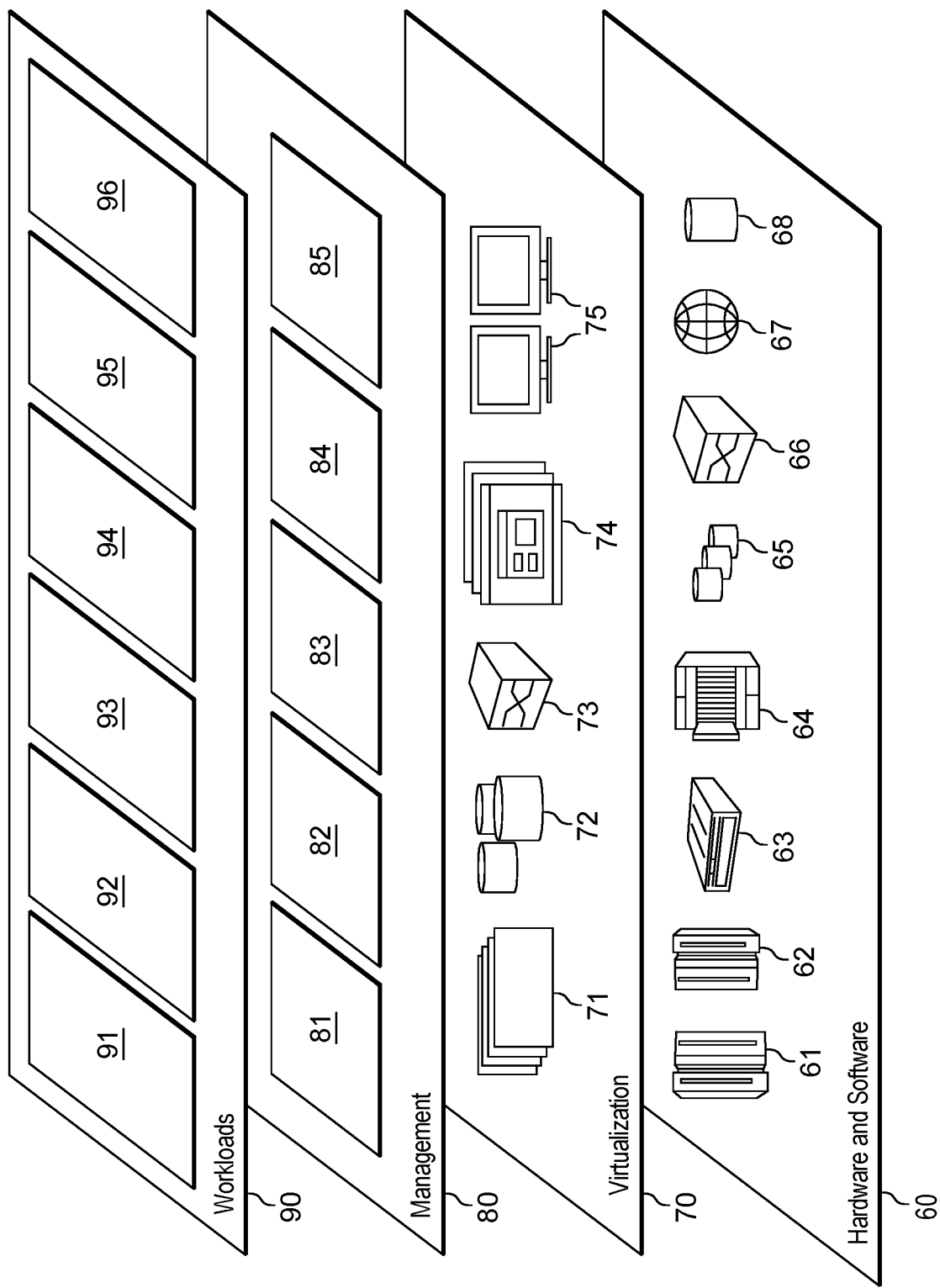
FIG. 9 depicts one example of abstraction model layers, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and command-type filtering processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, commands or operations may be used. Additionally, different types of indications or tags may be specified. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer readable storage media and program instructions collectively stored on the one or more computer readable storage media to perform a method comprising:
      dynamically determining, by an adjunct processor, whether commands obtained by the adjunct processor are to be processed by the adjunct processor, the dynamically determining being performed on a per-command basis and comprising:
         obtaining, by the adjunct processor, a command request of a requester, the command request including at least one filtering indicator indicating at least one valid command type for processing by the adjunct processor for the requester, the at least one valid command type being indicated as valid for the requester based on one or more permissible command types for the requester;
         determining, by the adjunct processor using the at least one filtering indicator, whether a command of the command request is valid for processing by the adjunct processor for the requester; and
         processing the command, by the adjunct processor, based on determining that the command is valid for processing by the adjunct processor for the requester.

2. The computer program product of claim 1, wherein the adjunct processor is configured in one mode and the dynamically determining enables it to operate differently than the one mode in which it is configured.

3. The computer program product of claim 2, wherein the adjunct processor configured in the one mode is able to process a set of commands, and wherein the adjunct processor operates differently in that it processes a reduced set of the set of commands.

4. The computer program product of claim 1, wherein the at least one filtering indicator is set on a per-command basis.

5. The computer program product of claim 4, wherein the at least one filtering indicator is set based on a computing policy corresponding to the requester of the command request.

6. The computer program product of claim 1, wherein the at least one filtering indicator includes a stateless command type indicator, wherein based on the stateless command type indicator being set to one value, commands determined to be stateless command type commands are valid for processing by the adjunct processor for the requester and other command type commands are invalid for processing by the adjunct processor for the requester.

7. The computer program product of claim 6, wherein based on the stateless command type indicator being set to another value the other command type commands are also considered valid for processing by the adjunct processor for the requester.

8. The computer program product of claim 1, wherein the processing includes preparing a reply that includes a result of the processing of the command, the reply to be sent to the requester.

9. The computer program product of claim 1, wherein the method further comprises preparing an error reply that indicates an error based on determining that the command is invalid for processing by the adjunct processor for the requester, the error reply to be sent to the requester.

10. The computer program product of claim 1, wherein the adjunct processor comprises a cryptographic card.

11. A computer system for facilitating processing within a computing environment, the computer system comprising:
   a memory; and
   at least one processor in communication with the memory, wherein the computer system is configured to perform a method, said method comprising:
      dynamically determining, by an adjunct processor, whether commands obtained by the adjunct processor are to be processed by the adjunct processor, the dynamically determining being performed on a per-command basis and comprising:
         obtaining, by the adjunct processor, a command request of a requester, the command request including at least one filtering indicator indicating at least one valid command type for processing by the adjunct processor for the requester, the at least one valid command type being indicated as valid for the requester based on one or more permissible command types for the requester;
         determining, by the adjunct processor using the at least one filtering indicator, whether a command of the command request is valid for processing by the adjunct processor for the requester; and
         processing the command, by the adjunct processor, based on determining that the command is valid for processing by the adjunct processor for the requester.

12. The computer system of claim 11, wherein the adjunct processor is configured in one mode and the dynamically determining enables it to operate differently than the one mode in which it is configured.

13. The computer system of claim 11, wherein the at least one filtering indicator is set on a per-command basis.

14. The computer system of claim 11, wherein the at least one filtering indicator includes a stateless command type indicator, wherein based on the stateless command type indicator being set to one value, commands determined to be stateless command type commands are valid for processing by the adjunct processor for the requester and other command type commands are invalid for processing by the adjunct processor for the requester.

15. The computer system of claim 11, wherein the method further comprises preparing an error reply that indicates an error based on determining that the command is invalid for processing by the adjunct processor for the requester, the error reply to be sent to the requester.

16. A computer-implemented method of facilitating processing within a computing environment, the computer-implemented method comprising:
   dynamically determining, by an adjunct processor, whether commands obtained by the adjunct processor are to be processed by the adjunct processor, the dynamically determining being performed on a per-command basis and comprising:
      obtaining, by the adjunct processor, a command request of a requester, the command request including at least one filtering indicator indicating at least one valid command type for processing by the adjunct processor for the requester, the at least one valid command type being indicated as valid for the requester based on one or more permissible command types for the requester;
      determining, by the adjunct processor using the at least one filtering indicator, whether a command of the command request is valid for processing by the adjunct processor for the requester; and
      processing the command, by the adjunct processor, based on determining that the command is valid for processing by the adjunct processor for the requester.

17. The computer-implemented method of claim 16, wherein the adjunct processor is configured in one mode and the dynamically determining enables it to operate differently than the one mode in which it is configured.

18. The computer-implemented method of claim 16, wherein the at least one filtering indicator is set on a per-command basis.

19. The computer-implemented method of claim 16, wherein the at least one filtering indicator includes a stateless command type indicator, wherein based on the stateless command type indicator being set to one value, commands determined to be stateless command type commands are valid for processing by the adjunct processor for the requester and other command type commands are invalid for processing by the adjunct processor for the requester.

20. The computer-implemented method of claim 16, further comprising preparing an error reply that indicates an error based on determining that the command is invalid for processing by the adjunct processor for the requester, the error reply to be sent to the requester.

21. The computer-implemented method of claim 16, wherein the processing includes preparing a reply that includes a result of the processing of the command, the reply to be sent to the requester.

22. The computer-implemented method of claim 16, wherein the adjunct processor comprises a cryptographic card.

23. The computer system of claim 12, wherein the adjunct processor configured in the one mode is able to process a set of commands, and wherein the adjunct processor operates differently in that it processes a reduced set of the set of commands.

24. The computer system of claim 11, wherein the processing includes preparing a reply that includes a result of the processing of the command, the reply to be sent to the requester.

25. The computer system of claim 11, wherein the adjunct processor comprises a cryptographic card.

* * * * *